United States Patent
Knapke et al.

(10) Patent No.: US 11,719,337 B2
(45) Date of Patent: Aug. 8, 2023

(54) METHODS AND SYSTEMS FOR A PARKING MECHANISM

(71) Applicant: Dana Heavy Vehicle Systems Group, LLC, Maumee, OH (US)

(72) Inventors: Brian V. Knapke, Maumee, OH (US); Nicholas W. Laforce, Whitehouse, OH (US); Aaron D. Gries, Perrysburg, OH (US); Robert D. Keller, Haskins, OH (US)

(73) Assignee: Dana Heavy Vehicle Systems Group, LLC, Maumee, OH (US)

( * ) Notice: Subject to any disclaimer, the term of this patent is extended or adjusted under 35 U.S.C. 154(b) by 98 days.

(21) Appl. No.: 17/214,663

(22) Filed: Mar. 26, 2021

(65) Prior Publication Data
US 2022/0307596 A1    Sep. 29, 2022

(51) Int. Cl.
*F16H 63/34*   (2006.01)
*F16H 63/36*   (2006.01)
*F16H 59/36*   (2006.01)

(52) U.S. Cl.
CPC ..... *F16H 63/3433* (2013.01); *F16H 63/3466* (2013.01); *F16H 63/36* (2013.01); *F16H 59/36* (2013.01)

(58) Field of Classification Search
CPC .. F16H 63/3433; F16H 63/3466; F16H 63/36; F16H 63/3425; F16H 63/3416; F16H 59/36
See application file for complete search history.

(56) References Cited

U.S. PATENT DOCUMENTS

| | | | |
|---|---|---|---|
| 5,265,804 A | 11/1993 | Brunel | |
| 8,240,448 B2 | 8/2012 | Hongawara et al. | |
| 8,881,883 B2 | 11/2014 | Barton et al. | |
| 2014/0346004 A1* | 11/2014 | Landino | F16H 63/3433 192/219.5 |
| 2015/0025750 A1* | 1/2015 | Weslati | B60W 10/11 701/48 |
| 2016/0033037 A1* | 2/2016 | Rhoades | F16H 63/3433 74/411.5 |
| 2020/0072351 A1* | 3/2020 | Chen | F16D 63/006 |
| 2020/0378497 A1* | 12/2020 | Hall | B60T 1/005 |
| 2022/0042599 A1* | 2/2022 | Diebel | F16H 63/3425 |
| 2022/0090678 A1* | 3/2022 | Morise | B60T 1/062 |
| 2022/0154823 A1* | 5/2022 | Haas | F16H 63/3425 |

FOREIGN PATENT DOCUMENTS

DE   102012221032 A1   5/2014

\* cited by examiner

*Primary Examiner* — Lori Wu
(74) *Attorney, Agent, or Firm* — McCoy Russell LLP (57) ABSTRACT

Methods and systems are provided for an actuation system for a parking mechanism in a transmission system of a vehicle. In one example, a system may include a protrusion positioned at one end of a higher diameter portion of a cam, the protrusion positioned to contact a pawl upon engagement of the pawl with a parking gear.

20 Claims, 5 Drawing Sheets

METHODS AND SYSTEMS FOR A PARKING MECHANISM

TECHNICAL FIELD

The present description relates generally to methods and systems for a modified cam and a cam stop in a parking mechanism of a vehicle transmission system or electric axle system.

BACKGROUND AND SUMMARY

Motorized vehicles may include a shift-by-wire system electrically coupling an automatic transmission of the vehicle to an instrument panel within a cabin of the vehicle. A user may interact with the instrument panel in order to select a gear mode of the transmission such as drive, park, neutral, etc. Upon the user selecting park as the desired transmission mode, a parking pawl may be actuated to engage a park gear of the transmission system and lock rotation of the park gear, thereby preventing the vehicle from moving. The park gear may be unlocked by disengaging the park pawl from the park gear. An input shaft of a cam may be rotated via the actuator to shift the pawl between the engaged and disengaged state.

As the actuator rotates the cam assembly, the pawl which is in face sharing contact with the cam may be forced to engage with the parking gear. The actuator may be an electric motor which is operated by a controller that turns an operating current of the actuator on and off based on a selection of a gear mode of the transmission system. There may be a difference in time between a signal from being transmitted by the controller and the actuator stopping rotation of the cam thereby causing the cam to rotate more than desired. The amount of additional rotation may be based on engine and transmission system conditions. However, this additional rotation may cause the cam to rotate beyond a desired position. In particular, when the vehicle is parked on a hill (grade), the additional rotation may cause the pawl to exert a torque onto the cam. The undesired force may cause the input shaft of the cam to twist and the packing mechanism to be stuck in an engaged state (with the pawl engaged with the parking gear).

Twisting of the input shaft may also occur during ratcheting events such as when the parking mode is selected even though the vehicle speed is higher than a non-zero threshold speed. During a ratcheting event, the pawl may not be engaged to the parking gear and the pawl may ratchet on the tops of the gear teeth. The pawl gear interaction may induce load onto the input shaft and/or torsion springs between the cam and the input shaft. Twisting of the input shaft and loading of the torsion springs may cause mechanical wear of the input shaft, springs, cam, and/or the actuator.

In one example, the issues described above may be addressed by a system for a parking mechanism of a vehicle, comprising: a protrusion positioned at one end of a higher diameter portion of a cam, the protrusion positioned to contact a pawl upon engagement of the pawl with a parking gear. In this way, by using a protrusion in the cam and a block on a parking mechanism housing, load transfer to the input shaft and associated parking mechanism components may be reduced.

As one example, a parking mechanism of a vehicle transmission system may include a pawl that is selectively engaged to a parking gear upon selection of park (by a user) as the desired transmission system mode. The parking mechanism may be actuated between a first state where the pawl is engaged to the parking gear to inhibit further movement of the vehicle wheel and a second state where the pawl is disengaged from the parking gear allowing transmission system to rotate the wheels. The lobe of the cam may include a protrusion jutting radially outward from one side of a higher diameter surface of the lobe. As the cam is rotated via the actuator, upon engagement of the pawl with the parking gear, the protrusion may come in fact sharing contact with the pawl, thereby preventing the cam to rotate any further. Further a block may be included on the housing of the parking mechanism. During a ratcheting event, the pawl may ratchet on the tops of the gear teeth and the cam may rest against the block with the protrusion in face sharing contact with the block.

In this way, by including a protrusion jutting radially outward from the cam lobe, movement of the pawl is limited and over rotation of the cam may be inhibited. By inhibiting rotation of the cam beyond a desired point, torque exerted by the pawl onto the cam may be reduced, thereby reducing the twisting of the input shaft. Also, by limiting the rotation of the cam, the parking mechanism may not be stuck in an engaged state even when the transmission gear mode is changed from park. The technical effect of including a block in the housing is that during a ratcheting or disengagement event, load from the interaction of the pawl and the parking gear may be transferred to the housing and not to the input shaft, cam, spring, and/or to the actuator. By transferring the load to the housing, mechanical wear of the parking mechanism components may be reduced. Overall, by including the protrusion on the cam and the block on the housing, operation of the parking mechanism may be improved and propensity for mechanical degradation of the system may be reduced.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 3:
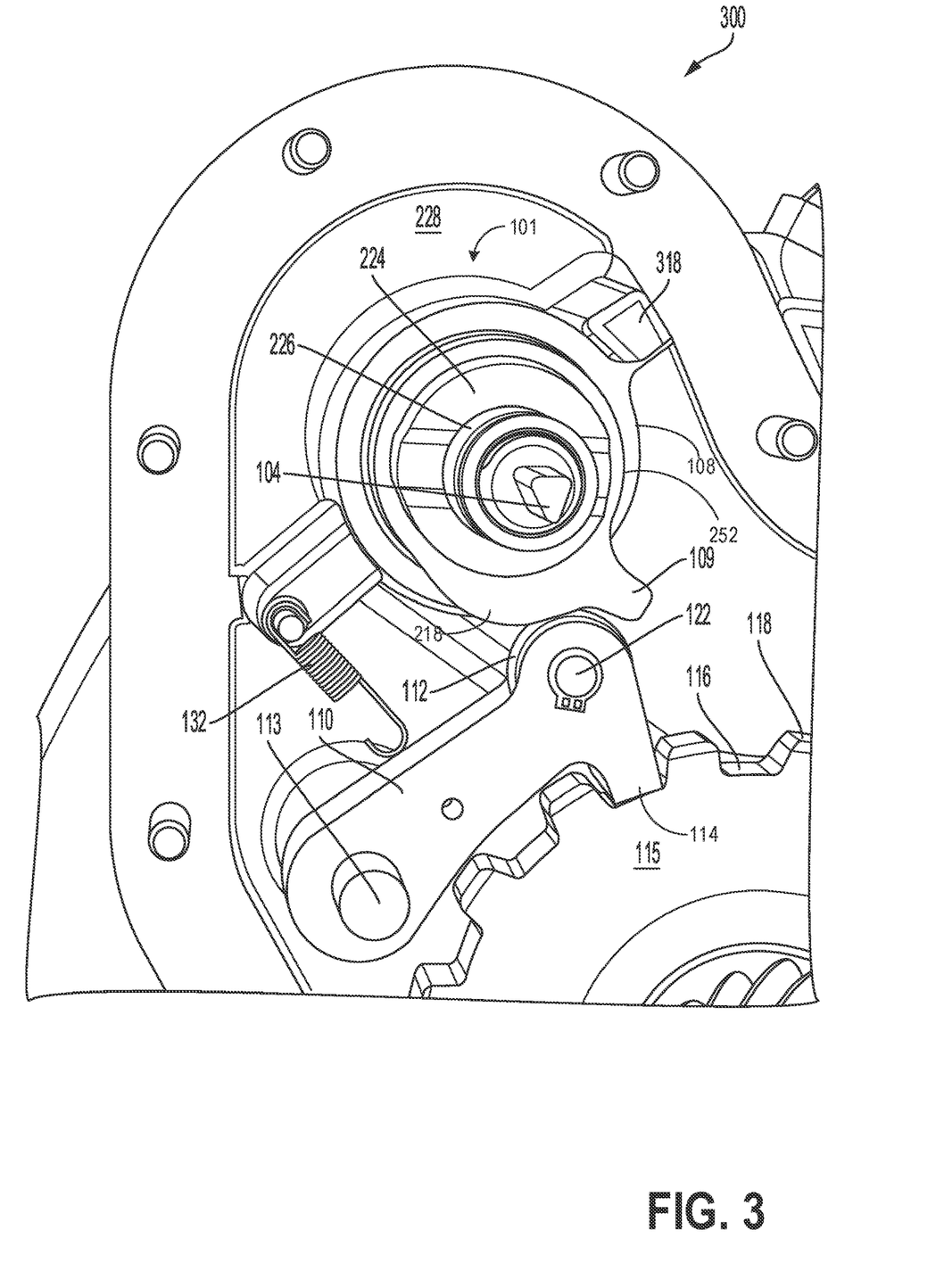
FIG. 3 shows a first position of the parking mechanism of the transmission system.
Figure 4:
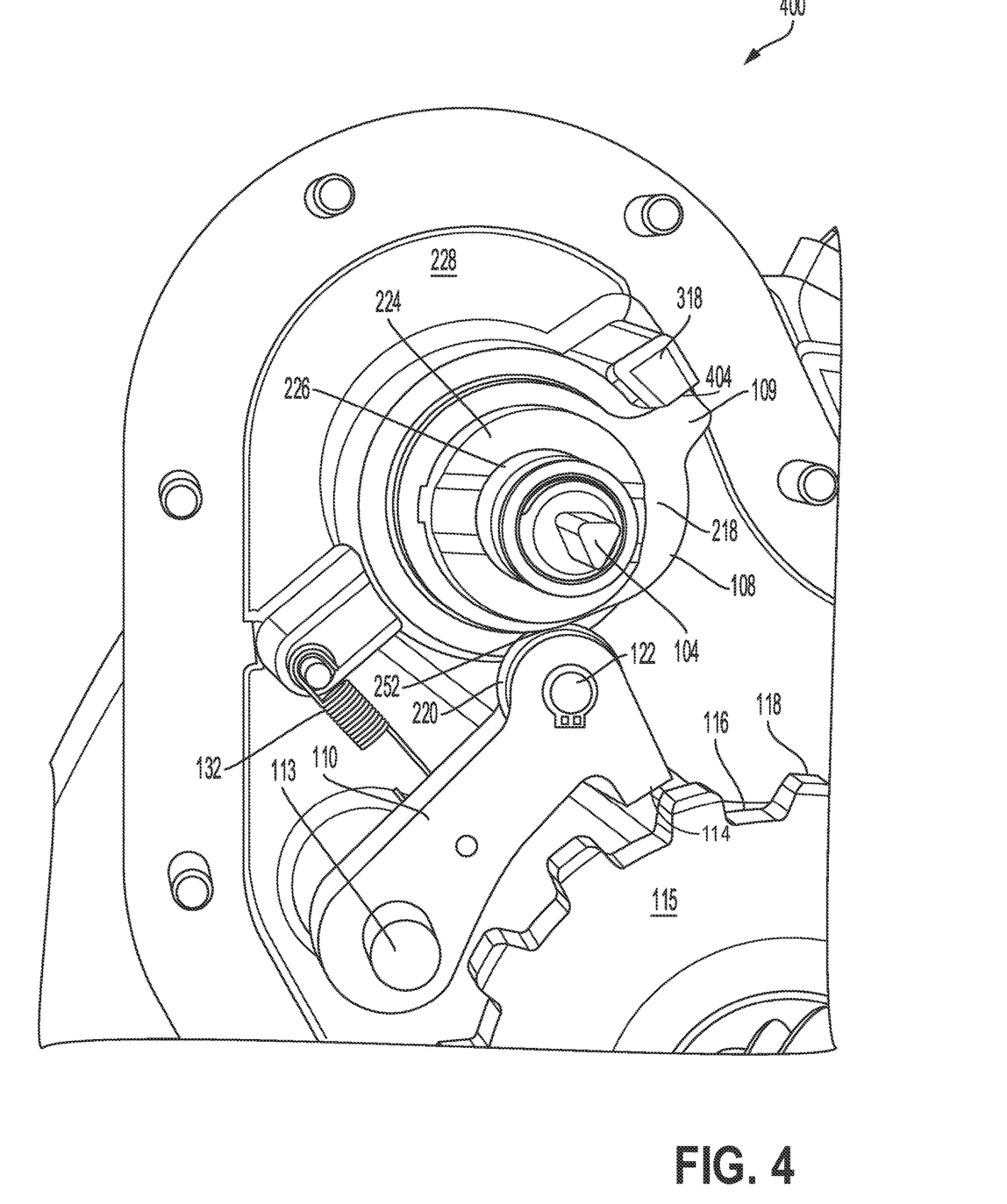
FIG. 4 shows a second position of the parking mechanism of the transmission system.

The following description relates to systems and methods for a cam and a cam stop in a parking mechanism of a vehicle transmission system. The parking mechanism including a modified cam, may be actuated between a first state and a second state via an actuation mechanism shown in FIG. 1. The modified cam is shown in further details in FIG. 2. The first state of the parking mechanism, as shown in FIG. 3, may correspond to a park mode of the transmission system, as selected by a user during vehicle travel at a lower than threshold vehicle speed. The second state of the parking mechanism, as shown in FIG. 4, may correspond to any non-park mode of the transmission system being selected by the user during vehicle travel at a higher than threshold vehicle speed. A vehicle controller may be configured to carry out a method, such as a method described in FIG. 5 to operate the parking mechanism based on a gear mode of the transmission system as selected by an operator.

Figure 1:
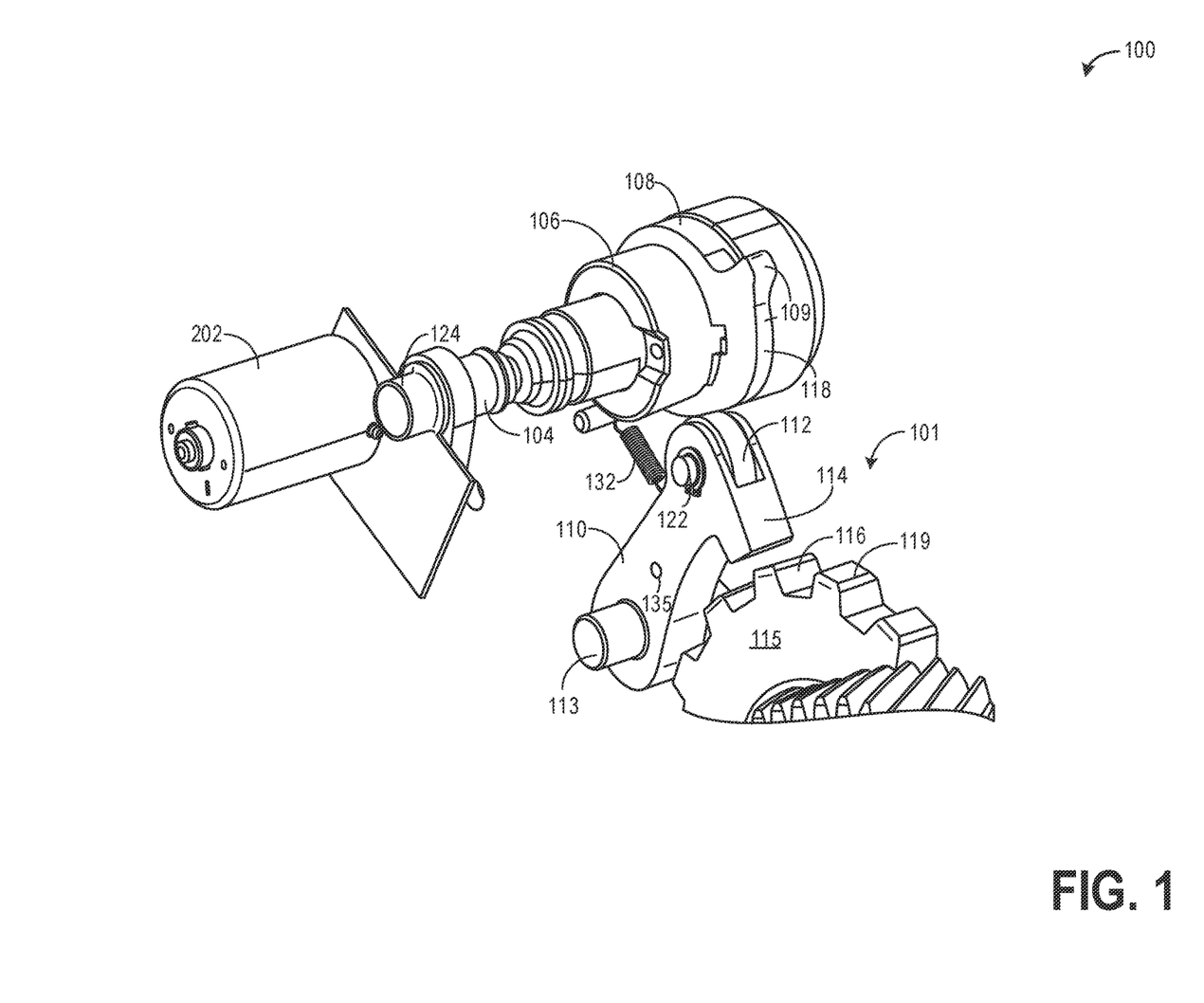
FIG. 1 shows an example parking mechanism of a transmission system including a modified cam.

FIG. 1 shows an example 100 of a parking mechanism 101 of a transmission system including an actuation mechanism 202. The parking mechanism 101 may include a parking gear 115 of the transmission system, the parking gear including alternating teeth 119 and ridges 116. The parking gear 115 may be coupled to an output shaft of the transmission system and may rotate with rotation of the output shaft.

A spring loaded pawl 110 may be positioned proximal to the parking gear and pivotally connected to a casing of the transmission system via the pivot 113. The pawl 110 may include an elongated portion ending in a protruded tooth 114. The pawl 110 may be moved upwards and downwards about the pivot 113. The end of the tooth 114 may be sized to occupy a ridge 116 between consecutive teeth 119 of the parking gear 115. The tooth 114 of the pawl 110 may include an arcuate upper surface and a roller 112 may be housed within the arcuate top portion of the pawl tooth 114. The roller 112 may be rotatable about its central axis, about the point 122.

The roller 112 may be in face sharing contact with a lobe of a modified cam 108. Rotation of the cam 108 may translate into rotation of the roller 112. The cam 108 may include a higher diameter surface 118 which may come into contact with the roller 112 upon rotation of the cam 108. The roller 112 may be used in order to reduce the overall amount of friction between the parking pawl 110 and the cam 108 when the parking mechanism 101 is in operation.

The actuation mechanisms 202 is drivingly connected to at least a portion of the cam 108. The power generated by the actuation mechanism 202 may be used in order to aid in selectively transitioning the parking mechanism 101 between a disengaged position illustrated in FIG. 4 and an engaged position illustrated in FIG. 3 of the disclosure. It is within the scope of this disclosure and as a non-limiting example that the actuation mechanism 202 may be one or more actuators, one or more electric motors, one or more pneumatic actuators, and/or one or more hydraulic actuators, and/or a mechanical actuator actuatable by an operator. Additionally, it is within the scope of this disclosure and as non-limiting example that the actuation mechanism 202 may be directly or indirectly connected to at least a portion of the cam 108 of the parking mechanism 101 via an output shaft 124 of the actuation mechanism 202. The output shaft 124 of the actuation mechanism 202 may be coupled to the cam 108 via an input shaft 104 and one or more flanges 106. In accordance with the embodiment where the actuation mechanism 202 is indirectly drivingly connected to at least a portion of the cam 108, the parking mechanism 101 may include a gearing arrangement (not shown) that is capable of transferring the rotational power generated by the actuation mechanism 202 to the cam 108.

The modified cam 108 may include a protrusion 109 positioned at one end of the higher diameter surface 118 to engage with the pawl upon actuation of the cam and the engagement of the pawl with the parking gear 115. The protrusion 109 may project radially outward from the center of the cam 108. The protrusion 109 may include a curved first side and a straight second side, a curvature of the curved first side complementary to a curvature of a roller housed within an arcuate top portion of a pawl tooth. Details of the protrusion 109 is discussed in relation to FIG. 2.

The parking mechanism may be in one of a first state with the higher diameter surface 118 of the cam 108 pushing down the pawl via the roller to engage the pawl within a ridge of the parking gear, and a second state with the pawl released from the ridge of the parking gear. In the first state of the parking mechanism, the roller may be in face sharing contact with the curved first side of the protrusion, and in the second state of the parking mechanism, the roller is in face sharing contact with the lower diameter portion of the cam. The parking mechanism may be actuated to the first state via the actuator upon selection of a parking mode of a transmission system of the vehicle with the vehicle operating below a threshold speed, and the parking mechanism may be actuated to the second state via the actuator upon selection of another mode of the transmission system.

A block may be positioned to protrude outward from a housing of the parking mechanism, a first side of the block parallel to the straight second side of the protrusion 109. The block may include flat sides with the first side of the block facing the straight second side of the protrusion and an adjoining second side of the block facing the lower diameter surface of the cam 108. During a ratcheting event with the parking mechanism being actuated to the first state, via the actuator and during a disengagement event, upon selection of the parking mode of the transmission system of the vehicle with the vehicle operating above the threshold speed, the first side of the block may abut the straight second side of the protrusion 109.

A biasing member aperture 135 may extend through an intermediate portion of the parking pawl 110 (between the tooth 114 and the pivot 113). The biasing member aperture 135 may be of a size and shape to receive and/or retain at least a portion of an end of one or more biasing members 132 therein. At least a portion of an end of the one or more biasing members 132 opposite the parking pawl 110 may be integrally connected to at least a portion of a drive unit housing, a parking mechanism housing, a transmission housing, a differential housing, a differential case, an inter-axle differential housing, a wheel end assembly, and/or a portion of a frame or a body of the vehicle. It is therefore to be understood that the one or more biasing members 132 may aid in ensuring that at least a portion of the parking pawl 110 is in direct contact with at least a portion of the cam 108 at all times. This aids in allowing the cam 108 to selectively transition the parking pawl 110 between a disengaged position and an engagement position. As a non-limiting example that the one or more biasing members 132 may be one or more springs.

Figure 2:
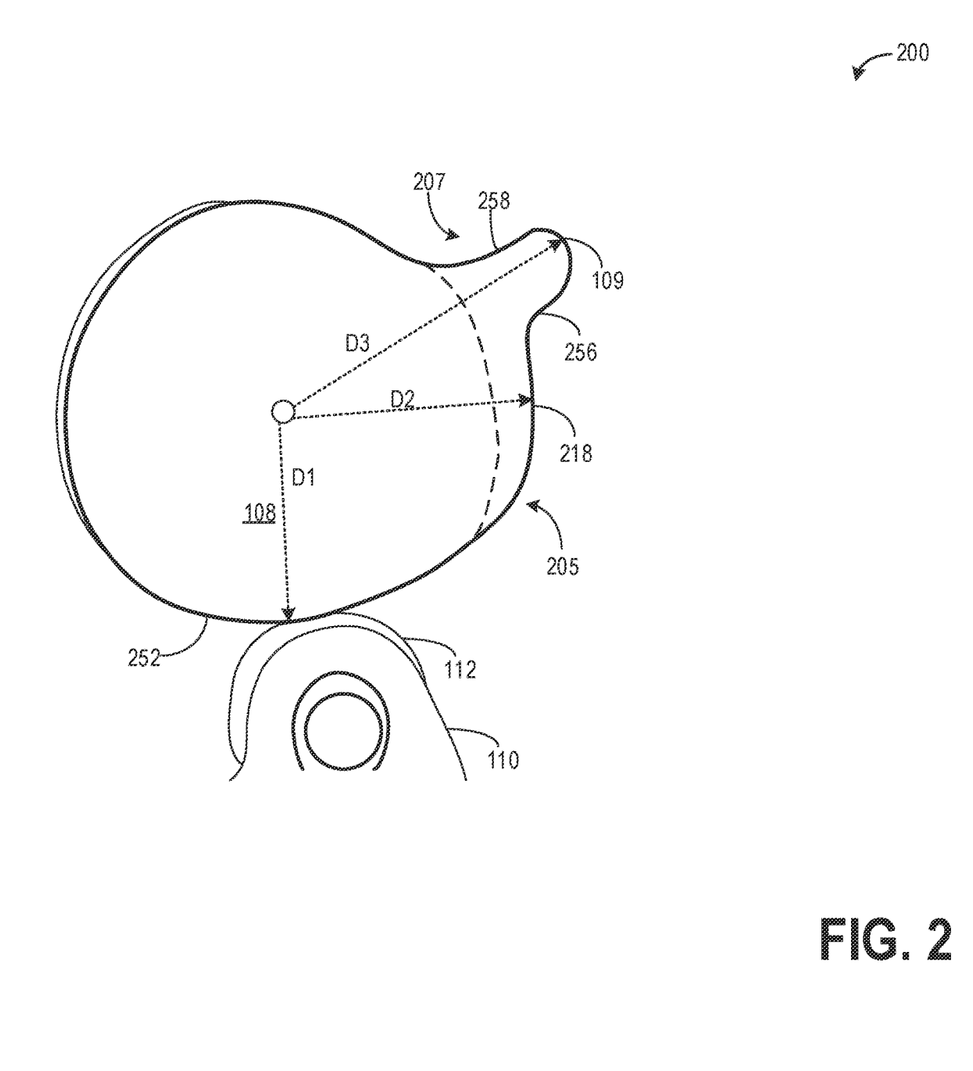
FIG. 2 shows details of the modified cam of the parking mechanism.

FIG. 2 shows an example schematic 200 of the modified cam 108 of the parking mechanism 101. The modified cam may include a lobe with varying radii. The lobe may include a first portion 252 with a lower diameter surface (diameter D1), a second portion 218 with a higher diameter surface (diameter D2), and a protrusion 109 (distance form center D3). Each of the diameters are measured relative to the center of the cam 108. Distance D3 is higher than the diameter D2 which is in turn higher than the diameter D1.

The diameter of the first portion 252 may remain substantially (such as within 5% variation) uniform between a first end 205 of the second portion and a second end 207 of the second portion. The diameter of the second portion 218 increases from the first end 205 of the second portion towards the second end 207 of the second portion. The protrusion 109 may be positioned at the second end 207 of the second portion 218. The protrusion 109 may include a curved first side 256 facing the first end 205 of the second portion 218. The curvature of the first side 256 may be complementary to the curvature of the roller 112 housed within the arcuate top portion of the pawl 110. During engagement of the parking mechanism, the surface of the roller 112 may be in face sharing contact with the first side 256 of the protrusion 109. Due to the complementary curvature of the surface of the roller 112 and the first side 256 of the protrusion 109, upon engagement of roller 112 surface with the first side 256, any further movement of the cam 108 may be terminated and the pawl 110 may rest with the roller 112 abutting the first side 256 of the protrusion 109.

The protrusion 109 may include a second side 258 opposite to the first side 256. Unlike the first side, the second side 258 may be straight (flat) without any substantial curvature. The surface of the second side 258 may be parallel to a block on the housing of the parking mechanism (not shown), and during certain conditions, as described in details in relation to FIG. 4, the second side 258 may be in face sharing contact with the block.

FIG. 3 shows an example first position 300 of the parking mechanism 101 and FIG. 4 shows an example second position 400 of the parking mechanism 101. The parking mechanism may include a housing 228 within which the cam 108 is positioned. The housing 228 may include an opening framed by a flange 229 and the cam 108 may be positioned within the opening, the flange 229 at least partially lining an outer surface of the cam 108. An input shaft 104 may pass through a central axis of the cam 108. The cam 108 may be rotated between a first position where the parking gear is engaged and a second position where the parking gear is not engaged by actuation of the input shaft 104 via the actuator (such actuator 202 in FIG. 1). In one example, the cam 108 may be held within opening of the housing by one or more flanges and rings 224 and 226 of varying diameters. In another example, the cam 108 may be held axially by springs and radially by a bearing.

A block 318 may be included on the housing 228 of the parking mechanism to inhibit rotation of the cam during a ratcheting event or disengagement event (as discussed in relation to FIG. 4). In alternate embodiments, the block may be included on one of a drive unit housing, a transmission housing, a differential housing, a differential case, an inter-axle differential housing, a wheel end assembly, and/or a portion of a frame or a body of the vehicle. The block 318 may protrude outward from the housing 228 with a first side of the block parallel to the straight second side of the protrusion 109 and a second side (adjacent to the first side) may abut the flange 229 framing the cam 108.

In the first position of the parking mechanism, as shown in example 300 in FIG. 3, the parking mechanism 101 may be actuated to a first position corresponding to a park mode of the transmission system as selected by the user while the vehicle is operated at a lower than threshold speed. In one example, the threshold speed may be in the range of 1-3 km/hour. As an example, the parking mechanism may be engaged to inhibit further movement of the vehicle wheels when vehicle speed is zero (such as vehicle stationary) or the vehicle speed is close to zero (vehicle is stopping).

Upon indication by the user that a park mode of the transmission system is selected, the controller may send a signal to the actuator of the parking system to actuate the cam 108 to the first position. There may be a difference in time between a signal from being transmitted by the controller and the actuator stopping rotation of the cam, causing the cam to rotate more than desired. Any additional rotation of the cam may cause the cam to rotate beyond a desired position. In particular, when the vehicle is parked on a hill (slope), the additional rotation may cause the pawl to exert a torque into the cam. The undesired force may cause the input shaft of the cam to twist and the packing mechanism to be stuck in an engaged state (with the pawl engaged with the parking gear).

In the first position, rotation of the input shaft 104 causes the cam 108 to rotate clockwise and the higher diameter surface of the second portion 218 to come in contact with the roller 112. The higher diameter surface of the second portion 218 of the cam 108 causes the roller 112 to push down the tooth 114 of the pawl 110 into a ridge 116 between two teeth 119 of the parking gear 115. By lodging the tooth 114 of the pawl 110 within the ridge 116, the parking gear 115 is locked in a position. As the tooth 114 is engaged with the parking gear 115, the curved, first side of the protrusion 109 may come in contact with the roller 112 to stop any further rotation of the cam. By stopping further rotation of the cam beyond the desired position, twisting of the input shaft may be limited and wear of the parking mechanism may be reduced. In the first position, the roller 112 is in face sharing contact with the second portion 218 and the curved, first side of the protrusion 109.

In the second position of the parking mechanism, as shown in example 400 in FIG. 4, the parking mechanism 101 may be actuated to a second position corresponding to a park mode of the transmission system as selected by the user while the vehicle is operated at a higher than threshold speed such as during a ratcheting event. During the ratcheting event, the pawl may not be engaged to the parking gear and the pawl may ratchet on the top surfaces of the parking gear teeth.

In the second position, the cam may rotate anti-clockwise until the straight (flat) second side of the protrusion 109 comes in face sharing contact with a first, flat surface 404 of the block 318 on the housing 228. As the protrusion 109 rests against the block 318, load from the interaction of the pawl and the parking gear may be transferred to the housing (via the block) and not to the input shaft and/or to other components of the parking mechanism. In this way, by diverting the load away from the input shaft and other parking mechanism components, robustness of the mechanism may be maintained and wear may be reduced.

In the second position, the first portion (lower diameter) of the cam is in contact with the roller 112. In this position, the tooth 114 of the pawl 110 may remain separated from the parking gear such as not lodged within a ridge 116 of the parking gear. In this position, the parking gear 115 may rotate along with the transmission system as engine torque is transmitted to the vehicle wheels via the output shaft of the transmission system. In the second state, the vehicle wheels are free to rotate even as the parking mode is selected.

The parking mechanism may also be actuated to a third position corresponding to a mode of the transmission system other than the park mode (such as drive, reverse, etc.) as selected by the user. In the third position, rotation of the input shaft 104 causes the cam 108 to rotate in an anti-clockwise direction and the first portion (lower diameter) of the cam to come in contact with the roller 112. In this position, the tooth 114 of the pawl 110 may remain separated from the parking gear such as not lodged within a ridge 116 of the parking gear. In the third position, the protrusion 109 may not be in contact with either the roller 220 of the pawl or the block 318. As an example, the protrusion 109 may remain between the pawl and the block. In this position, the pawl 110 is not in contact with the parking gear 115, thereby allowing the parking gear 115 to rotate along with the transmission system as drive torque is transmitted to the vehicle wheels via the output shaft of the transmission system. In the third position, the vehicle wheels are free to rotate.

In this way, the systems of FIGS. 1-4 provide for a system for a parking mechanism for a vehicle, comprising: a housing framing a cam, the cam rotatable between a first position and a second position via an actuator, and the cam including a first, lower diameter portion and a second higher diameter portion, a protrusion projecting outward from an end of the second higher diameter portion of the cam, a block projecting outward from the housing, and a pawl including a tooth formed to engage with a parking gear.

Figure 5:
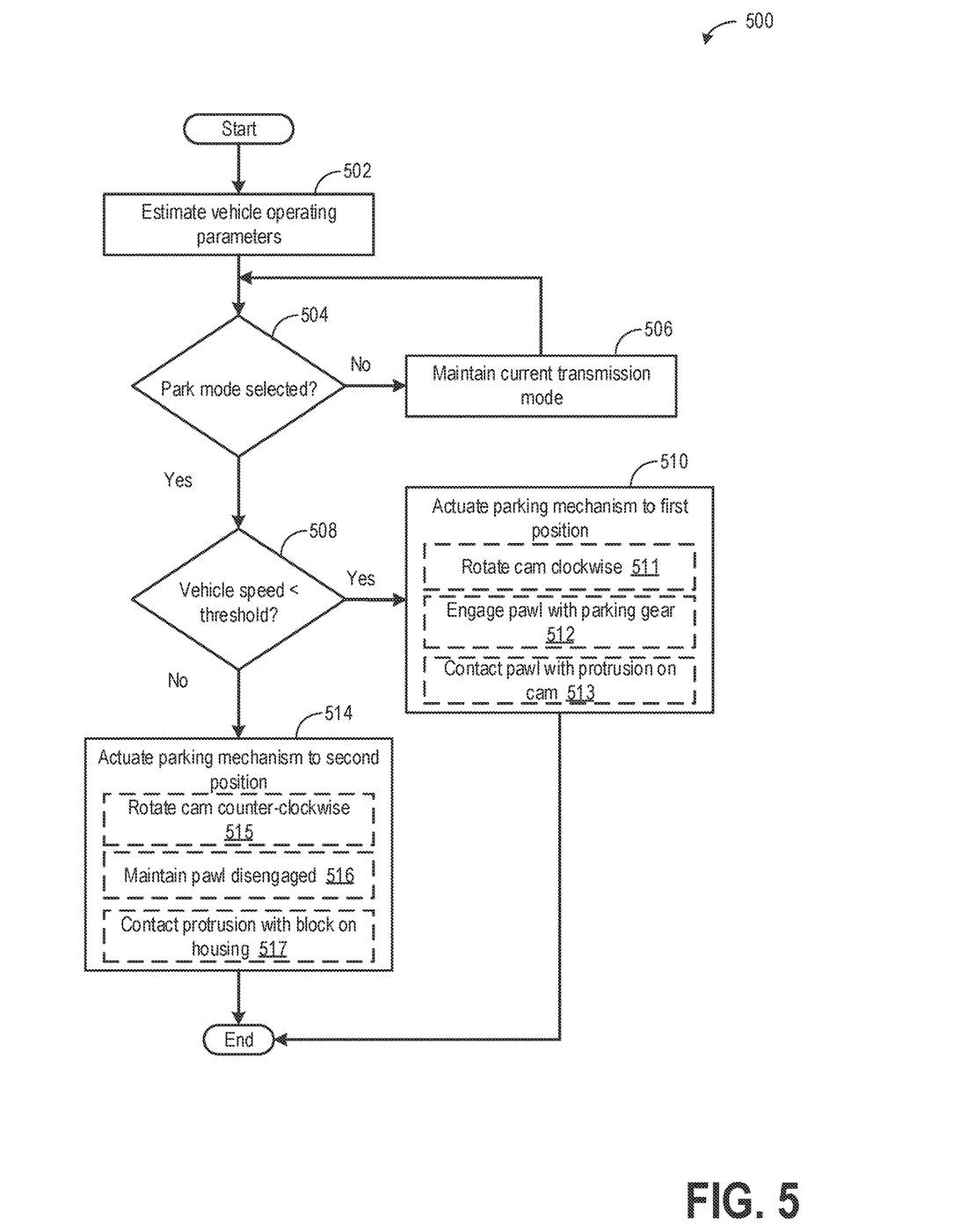
FIG. 5 shows an example flow-chart for operating the parking mechanism.

FIG. 5 shows an example method 500 for operating a parking mechanism (such as parking mechanism 101 in FIG. 1) of a vehicle transmission system. The parking mechanism may be actuated to engage a pawl with a parking gear which would inhibit the vehicle wheels from rolling, and disengage the pawl from the parking gear which would allow movement of the vehicle wheels. Instructions for carrying out method 500 and the rest of the methods included herein may be executed by a controller based on instructions stored on a memory of the controller and in conjunction with signals received from sensors of the vehicle system. The controller may employ engine actuators of the vehicle system to adjust engine operation, according to the methods described below.

At 502, the routine includes estimating vehicle operating conditions including vehicle speed, vehicle acceleration, engine speed, engine load, engine temperature. Also, ambient conditions such as ambient temperature and humidity may be estimated via vehicle sensors.

At 504, the routine includes determining if a park mode of the transmission system has been selected. A vehicle operator may select a mode of operation of the transmission system such as park via an onboard instrument panel. If it is determined that the park mode is not selected, at 506, the current transmission mode (such as drive, reverse, neutral) may be maintained. As an example, a pawl of the parking mechanism may not be engaged to the parking gear and an output shaft of the transmission system, thereby allowing the vehicle wheels to rotate.

If it is determined that a park mode has been selected, at 508, the routine includes determining if the vehicle speed is lower than a threshold speed. The threshold speed may be pre-calibrated based on a speed of the vehicle below which rotation of the vehicle wheels may be suspended. In one example, the threshold speed may be in the range of 1-3 km/hour. If it is determined that the vehicle speed is lower than the threshold speed, it may be inferred that the parking mechanism may be engaged to stop the vehicle wheels from further rotation.

At 510, the parking mechanism may be actuated to a first position. Actuating to the first position includes, at 511, rotating the cam in a clockwise direction via rotation of an input shaft of the cam as actuated by an actuator of the parking mechanism. As an example, an electric motor may rotate the input shaft of the cam which causes the cam to rotate in the clockwise direction. As the cam rotates clockwise, a higher diameter portion of the cam comes in contact with a roller housed in a top portion of a tooth of the pawl causing the tooth to be pushed within a ridge of the parking gear. As the tooth of the pawl is inserted into a ridge, at 512, the pawl is engaged with the parking gear. Upon engagement of the pawl, at 513, the roller of the pawl may come in contact with a first curved side of a protrusion at one end of the higher diameter portion of the cam. Any further rotation of the cam is inhibited upon the protrusion contacting the pawl, thereby limiting possibility of twisting of the cam's intake shaft. The pawl may remain engaged to the parking gear until a transmission gear mode different from the parking mode is selected by the user.

If it is determined that the vehicle speed is higher than the threshold speed, a ratcheting event may take place where the pawl may not be engaged to the parking gear even when a parking mode is selected by the user. At 514, the parking mechanism may be actuated to a second position. Actuation to the second position may include at 515, rotating the cam in a counter-clockwise direction via rotation of the input shaft of the cam as actuated by the actuator of the parking mechanism. As the cam is rotated counter-clockwise, at 516, the pawl may ratchet on the tops of the gear teeth and remain disengaged from the parking gear. At 517, a second, flat side of the protrusion may come in contact with a block jutting out of a housing of the parking mechanism. Upon contact of the protrusion with the block, the cam may stop rotating any further, and load from the ratcheting may be transferred to the housing via the block.

In this way, during a first condition, a parking pawl may be engaged with a parking gear, the parking pawl contacting a protrusion projecting radially outward from an end of a higher diameter portion of a cam, and during a second condition, the parking pawl may be maintained disengaged from the parking gear with the protrusion contacting a block formed on a housing of the parking mechanism. The first condition may be a parking mode of a transmission system being selected by a user while a speed of the vehicle is below a threshold speed, and the second condition may be the parking mode of the transmission system selected by the user while the speed of the vehicle is above threshold speed. By using a protrusion on the cam and a block on the housing, rotation of the cam may be stopped at desired points and load transfer to the input shaft of the cam may be reduced. Overall, by reducing stress on the input shaft and the actuator of the parking mechanism, mechanism wear of the system may be reduced and robustness may be improved.

In one example, a system for a parking mechanism of a vehicle, comprising: a protrusion positioned at one end of a higher diameter portion of a cam, the protrusion positioned to contact a pawl upon engagement of the pawl with a parking gear. In the preceding example, additionally or optionally, the cam includes a lower diameter portion and the higher diameter portion, a dimeter of the higher diameter portion increasing from a first end to a second end. In any or all of the preceding examples, additionally or optionally, the protrusion is projecting radially outward from the second end of the higher diameter portion. In any or all of the preceding examples, additionally or optionally, the protrusion includes a curved first side and a straight second side, a curvature of the curved first side complementary to a curvature of a roller housed within an arcuate top portion of a pawl tooth. In any or all of the preceding examples, additionally or optionally, the parking mechanism includes each of an actuator with an output shaft of the actuator coupled an input shaft of the cam, the pawl coupled to the cam via the roller, and a parking gear. In any or all of the preceding examples, additionally or optionally, the parking mechanism is in one of a first state with the higher diameter portion of the cam pushing down the pawl via the roller to engage the pawl within a ridge of the parking gear, and a second state with the pawl released from the ridge of the parking gear. In any or all of the preceding examples, additionally or optionally, in the first state of the parking mechanism, the roller is in face sharing contact with the curved first side of the protrusion, and wherein in the second state of the parking mechanism, the roller is in face sharing contact with the lower diameter portion of the cam. In any or all of the preceding examples, additionally or optionally, the parking mechanism is actuated to the first state via the actuator upon selection of a parking mode of a transmission system of the vehicle with the vehicle operating below a threshold speed, and wherein the parking mechanism is actuated to the second state via the actuator upon selection of another mode of the transmission system. Any or all of the preceding examples, further comprising, additionally or optionally, a block protruding outward from a housing of the parking mechanism, a first side of the block parallel to the straight second side of the protrusion. In any or all of the preceding examples, additionally or optionally, the block includes flat sides, the first side of the block facing the straight second side of the protrusion and an adjoining second side of the block facing the lower diameter portion of the cam. In any or all of the preceding examples, additionally or optionally, the first side of the block abuts the straight second side of the protrusion during a ratcheting event with the parking mechanism being actuated to the first state via the actuator upon selection of the parking mode of the transmission system of the vehicle with the vehicle operating above the threshold speed.

In another example, a method for a parking mechanism of a vehicle, comprises: during a first condition, engaging a parking pawl with a parking gear, the parking pawl contacting a protrusion projecting radially outward from an end of a higher diameter portion of a cam, and during a second condition, maintaining the parking pawl disengaged from the parking gear with the protrusion contacting a block formed on a housing of the parking mechanism. In the preceding example, additionally or optionally, the first condition is a parking mode of a transmission system selected by a user while a speed of the vehicle is below a threshold speed, and wherein the second condition is the parking mode of the transmission system selected by the user while the speed of the vehicle is above threshold speed. In any or all of the preceding examples, additionally or optionally, in the first condition, a curved first side of the protrusion is in face sharing contact with a roller housed within a top portion of the parking pawl inhibiting further rotation of the cam, and wherein in the second condition, a flat second side of the protrusion is in face sharing contact with a first flat side of the block inhibiting further rotation of the cam. In any or all of the preceding examples, the method further comprising, additionally or optionally, during a third condition, the parking pawl is disengaged from the parking gear with the pawl in face sharing contact with a lower diameter portion of the cam and the protrusion not contacting either the pawl or the block. In any or all of the preceding examples, additionally or optionally, the cam is rotated via an input shaft passing through a central axis of the cam, the input shaft actuated via an electric motor.

In yet another example, a system for a parking mechanism for a vehicle, comprises: a housing framing a cam, the cam rotatable between a first position and a second position via an actuator, and the cam including a first, lower diameter portion and a second higher diameter portion, a protrusion projecting outward from an end of the second higher diameter portion of the cam, a block projecting outward from the housing, and a pawl including a tooth formed to engage with a parking gear. In the preceding example, additionally or optionally, in the first position of the cam, a first curved surface of the protrusion is in face sharing contact with the tooth of the pawl and the tooth is engaged within the parking gear, and wherein in the second position of the cam, a second flat surface of the protrusion is in face sharing contact with the block and the tooth is disengaged from the parking gear. In any or all of the preceding examples, additionally or optionally, in the first position of the cam, upon rotation of an input shaft of the cam via the actuator, the cam is only rotatable in an anti-clockwise direction and wherein in the second position of the cam, upon rotation of the input shaft of the cam via the actuator, the cam is only rotatable in a clockwise direction. In any or all of the preceding examples, additionally or optionally, a first distance from a center of the cam to a tip of the protrusion is higher than a second radius of the second higher diameter portion of the cam, and wherein the second radius of the second higher diameter portion of the cam is higher than a first radius of the first, lower diameter portion of the cam.

FIGS. 3-4 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system for a parking mechanism of a vehicle, comprising:
   a housing comprising a block,
   a cam comprising a protrusion positioned at one end of a higher diameter portion of the cam, the protrusion positioned to contact a pawl when the pawl is engaged with a parking gear, and
   the pawl in face sharing contact with a lower diameter portion of the cam and the protrusion contacting the block when the pawl is in a disengaged position from the parking gear.

2. The system of claim 1, wherein a diameter of the higher diameter portion increases from a first end to a second end.

3. The system of claim 2, wherein the protrusion is projecting radially outward from the second end of the higher diameter portion.

4. The system of claim 2, wherein the protrusion includes a curved first side and a straight second side, a curvature of the curved first side complementary to a curvature of a roller housed within an arcuate top portion of a pawl tooth.

5. The system of claim 4, wherein the parking mechanism includes an actuator with an output shaft coupled to an input shaft of the cam, the pawl coupled to the cam via the roller, and the parking gear.

6. The system of claim 5, wherein in a first state of the parking mechanism, the higher diameter portion of the cam pushes down the pawl via the roller to engage the pawl within a ridge of the parking gear, and
   in a second state of the parking mechanism, the pawl releases from the ridge of the parking gear.

7. The system of claim 6, wherein in the first state of the parking mechanism, the roller is in face sharing contact with the curved first side of the protrusion, and wherein in the second state of the parking mechanism, the roller is in face sharing contact with the lower diameter portion of the cam.

8. The system of claim 6, wherein the parking mechanism is actuated to the first state via the actuator upon selection of a parking mode of a transmission system of the vehicle with the vehicle operating below a threshold speed, and wherein the parking mechanism is actuated to the second state via the actuator upon selection of another mode of the transmission system.

9. The system of claim 8, wherein the block protrudes outward from the housing of the parking mechanism and a first side of the block parallel to the straight second side of the protrusion.

10. The system of claim 9, wherein the block includes flat sides, the first side of the block facing the straight second side of the protrusion and an adjoining second side of the block facing the lower diameter portion of the cam.

11. The system of claim 9, wherein the first side of the block abuts the straight second side of the protrusion during a ratcheting event with the parking mechanism being actuated to the first state via the actuator upon selection of the parking mode of the transmission system of the vehicle with the vehicle operating above the threshold speed.

12. A method for a parking mechanism of a vehicle, comprising:
   during a first condition, engaging a parking pawl with a parking gear, the parking pawl contacting a protrusion projecting radially outward from an end of a higher diameter portion of a cam, and a first side of the protrusion in face sharing contact with a roller housed within a portion of the parking pawl; and
   during a second condition, maintaining the parking pawl disengaged from the parking gear with the protrusion contacting a block formed on a housing of the parking mechanism.

13. The method of claim 12, wherein the first condition is a parking mode of a transmission system selected by a user while a speed of the vehicle is below a threshold speed, and wherein the second condition is the parking mode of the transmission system selected by the user while the speed of the vehicle is above the threshold speed.

14. The method of claim 12, wherein the first side of the protrusion is curved and the contact of the first side of the protrusion and the roller inhibits further rotation of the cam, and
   in the second condition, a flat second side of the protrusion is in face sharing contact with a first flat side of the block inhibiting further rotation of the cam.

15. The method of claim 12, further comprising, during a third condition, the parking pawl is disengaged from the parking gear with the pawl in face sharing contact with a lower diameter portion of the cam and the protrusion not contacting either the pawl or the block.

16. The method of claim 12, wherein the cam is rotated via an input shaft passing through a central axis of the cam, the input shaft actuated via an electric motor.

17. A system for a parking mechanism for a vehicle, comprising:
   a housing framing a cam, the cam rotatable between a first position and a second position via an actuator, and the cam including a first lower diameter portion and a second higher diameter portion;
   a protrusion projecting outward from an end of the second higher diameter portion of the cam;
   a block projecting outward from the housing; and
   a pawl including a tooth formed to engage with a parking gear, the pawl in face sharing contact with the first lower diameter portion of the cam when the tooth is in a disengaged position from the parking gear.

18. The system of claim 17, wherein in the first position of the cam, a first curved surface of the protrusion is in face sharing contact with the tooth of the pawl and the tooth is engaged within the parking gear, and wherein in the second position of the cam, a second flat surface of the protrusion is in face sharing contact with the block and the tooth is disengaged from the parking gear.

19. The system of claim 18, wherein in the first position of the cam, upon rotation of an input shaft of the cam via the actuator, the cam is only rotatable in a first direction and wherein in the second position of the cam, upon rotation of the input shaft of the cam via the actuator, the cam is only rotatable in a second direction opposite the first direction.

20. The system of claim 18, wherein a first distance from a center of the cam to a tip of the protrusion is higher than a second radius of the second higher diameter portion of the cam, and wherein the second radius of the second higher diameter portion of the cam is higher than a first radius of the first lower diameter portion of the cam.

* * * * *